United States Patent
Nakane et al.

(10) Patent No.: US 11,607,791 B2
(45) Date of Patent: Mar. 21, 2023

(54) ELECTRICALLY POWERED TOOL

(71) Applicant: MAKITA CORPORATION, Anjo (JP)

(72) Inventors: Yasumasa Nakane, Anjo (JP); Katsumi Okouchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 156 days.

(21) Appl. No.: 17/279,055

(22) PCT Filed: Aug. 29, 2019

(86) PCT No.: PCT/JP2019/033841
§ 371 (c)(1),
(2) Date: Mar. 23, 2021

(87) PCT Pub. No.: WO2020/071014
PCT Pub. Date: Apr. 9, 2020

(65) Prior Publication Data
US 2022/0088762 A1    Mar. 24, 2022

(30) Foreign Application Priority Data

Oct. 2, 2018 (JP) .............................. JP2018-187325

(51) Int. Cl.
*B25F 5/00* (2006.01)
*F16H 55/14* (2006.01)

(52) U.S. Cl.
CPC .............. *B25F 5/006* (2013.01); *B25F 5/001* (2013.01); *F16H 55/14* (2013.01)

(58) Field of Classification Search
CPC .......... B23D 45/16; B25F 5/001; B25F 5/006; F16H 55/14
See application file for complete search history.

(56) References Cited

U.S. PATENT DOCUMENTS

| | | | |
|---|---|---|---|
| 2002/0020540 A1 | 2/2002 | Kamimura et al. | |
| 2005/0224245 A1* | 10/2005 | Kamimura | B24B 23/00 173/211 |

(Continued)

FOREIGN PATENT DOCUMENTS

| | | |
|---|---|---|
| JP | S52-001956 Y2 | 1/1977 |
| JP | S61-069401 A | 4/1986 |

(Continued)

OTHER PUBLICATIONS

Jun. 28, 2022 Office Action issued in Japanese Patent Application No. 2018-187325.

(Continued)

*Primary Examiner* — Daniel Jeremy Leeds
(74) *Attorney, Agent, or Firm* — Oliff PLC

(57) ABSTRACT

A power tool such as a portable cutting machine has less gear noise from, for example, a reduction gear train under no load. The power tool includes a blade, an electric motor including a motor shaft, and a gear train that transmits a rotational output from the electric motor to the blade. The gear train includes a first gear supported on the motor shaft, a countershaft, an intermediate gear meshing with the first gear and supported on the countershaft, a final shaft having a distal end attached to the blade, a final gear meshing with the intermediate gear and supported on the final shaft, and at least one elastic member between the final shaft and the final gear.

19 Claims, 8 Drawing Sheets

(56) References Cited

U.S. PATENT DOCUMENTS

2016/0355087 A1 12/2016 Yoneda
2018/0050398 A1* 2/2018 Kumakura ............. B23D 47/12

FOREIGN PATENT DOCUMENTS

| | | |
|---|---|---|
| JP | 2002-137179 A | 5/2002 |
| JP | 2005-297125 A | 10/2005 |
| JP | 2005-324375 A | 11/2005 |
| JP | 2006-160168 A | 6/2006 |
| JP | 2009-090393 A | 4/2009 |
| JP | 2010-194697 A | 9/2010 |
| JP | 4563074 B2 | 10/2010 |
| JP | 4730580 B2 | 7/2011 |
| JP | 2016-222183 A | 12/2016 |
| WO | 2016/158131 A1 | 10/2016 |

OTHER PUBLICATIONS

Oct. 15, 2019 International Search Report issued in International Patent Application No. PCT/JP2019/033841.
Mar. 23, 2021 International Preliminary Report on Patentability issued in International Patent Application No. PCT/JP2019/033841.

* cited by examiner

ELECTRICALLY POWERED TOOL

FIELD

The present invention relates to a power tool such as a portable cutting machine, and to a portable cutting machine that is held with an operator's hand and moved to cause its disc-shaped blade to cut into a workpiece.

BACKGROUND

A portable cutting machine has a drive path for reducing the rotational output from an electric motor as its drive and transmitting the rotational output to an output shaft to which a disc-shaped blade is attached. A reduction mechanism for reducing the rotational output from the electric motor may include, for example, a gear train that achieves speed reduction using meshing gears. The portable cutting machine may include a smaller gear reduction mechanism and produce more cutting power from the blade, and may thus include a double-stage reduction mechanism that reduces the rotational output from the electric motor using a two-stage gear train. Japanese Unexamined Patent Application Publication No. 2009-90393 (Patent Literature 1), Japanese Unexamined Patent Application Publication No. 2010-194697 (Patent Literature 2), Japanese Unexamined Patent Application Publication No. 2005-324375 (Patent Literature 3), and Japanese Unexamined Patent Application Publication No. 2005-297125 (Patent Literature 4) describe reduction mechanisms mainly including gear trains. Patent Literatures 1 and 2 describe double-stage reduction mechanisms. The techniques described in Patent Literatures 1 and 2 use shock absorbers for a countershaft for less vibration and less noise. Patent Literature 3 describes a single-stage reduction mechanism including a second shaft and a second gear that are loosely coupled together with, for example, a clearance fit, and with a shock absorber between the shaft and the gear. Patent Literature 4 describes a single-stage reduction mechanism including a second shaft and a second gear with shock absorbers between them in the rotation direction.

BRIEF SUMMARY

Technical Problem

The double-stage reduction mechanisms described in Patent Literatures 1 and 2 each include a final gear press-fitted on and substantially integral with a final shaft (output shaft), thus forming one heavy piece including the final gear, the final shaft, and a blade. The final gear receives a high moment of inertia in response to rotation of the blade. The motor shaft is also integral with a heavy rotor. Particularly during idling of the blade under no load, the countershaft that is lightweight receives moments of inertia both from the motor shaft and the final shaft and rotates irregularly. The countershaft receives gear vibration, which is repeated impact from the meshing teeth between the final gear and the driving intermediate gear, thus producing gear noise (rattle) under no load. The single-stage reduction mechanisms described in Patent Literatures 3 and 4 include no lightweight countershaft and are thus free from such gear noise under no load.

One or more aspects of the present invention are directed to a power tool such as a portable cutting machine, and particularly to a power tool with less gear noise from, for example, a reduction gear train under no load.

Solution to Problem

An aspect of the present invention provides a power tool, including:
a blade;
an electric motor including a motor shaft; and
a gear train configured to transmit a rotational output from the electric motor to the blade, the gear train including
    a first gear supported on the motor shaft,
    a countershaft,
    an intermediate gear meshing with the first gear and supported on the countershaft,
    a final shaft having a distal end attached to the blade,
    a final gear meshing with the intermediate gear and supported on the final shaft, and
    at least one elastic member between the final shaft and the final gear.

DETAILED DESCRIPTION

First Embodiment

Figure 1:
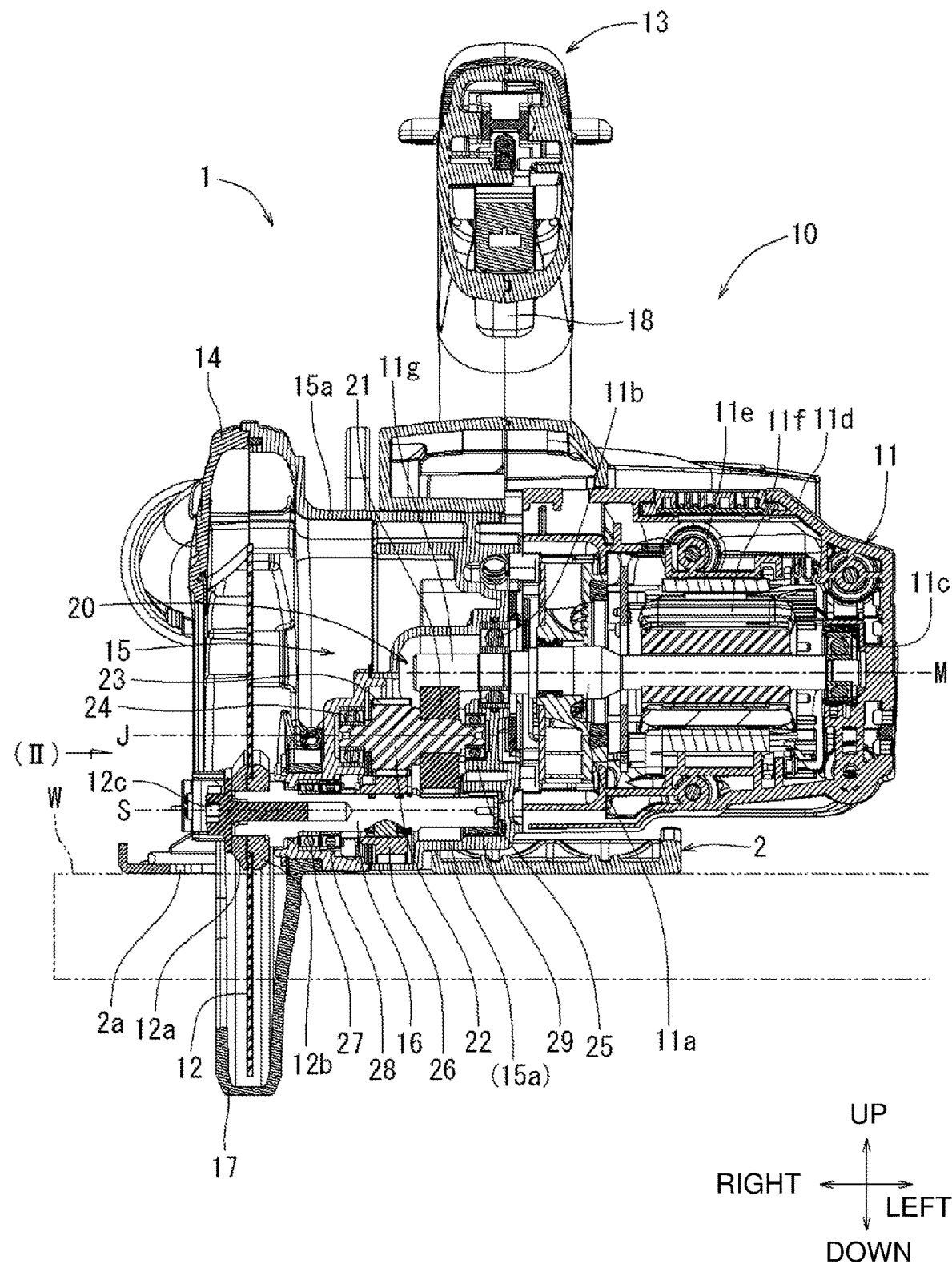
FIG. 1 is a longitudinal sectional view of a portable cutting machine according to one or more embodiments as viewed from the front for cutting, with a gear train shown in a sectional view taken along the axes of a motor shaft, a countershaft, and a final shaft as indicated by line (I)-(I) as viewed in the direction indicated by arrows in FIG. 2.

A power tool according to a first embodiment will now be described with reference to FIGS. 1 to 11. The power tool according to the present embodiment is a portable cutting machine. FIG. 1 shows a portable cutting machine 1 according to the present embodiment. The portable cutting machine 1 is a handheld cutting tool also called a portable circular saw. The portable cutting machine 1 includes a base 2 and a cutting machine body 10. The base 2, which is a rectangular flat plate, is placed in contact with the upper surface of a workpiece W. The cutting machine body 10 is supported on the upper surface of the base 2.

The cutting machine body 10 includes an electric motor 11 as its drive, a circular rotary blade 12, and a looped handle 13. The rotary blade 12 is a circular saw blade for mainly cutting wood workpieces. The rotary blade 12 has its upper half substantially covered with a stationary cover 14.

The stationary cover 14 has a reduction gear unit 15 on the left. The reduction gear unit 15 includes a left portion coupled to the electric motor 11. The reduction gear unit 15 includes a substantially cylindrical gear housing 15a. The gear housing 15a is integral with the stationary cover 14 on the left of the stationary cover 14. The reduction gear unit 15 accommodates a gear train 20 for reducing the rotational output from the electric motor 11 in two stages. The gear train 20 defines a power transmission path for transmitting the rotational output from the electric motor 11 finally to the rotary blade 12 as rotational power (cutting power).

Figure 2:
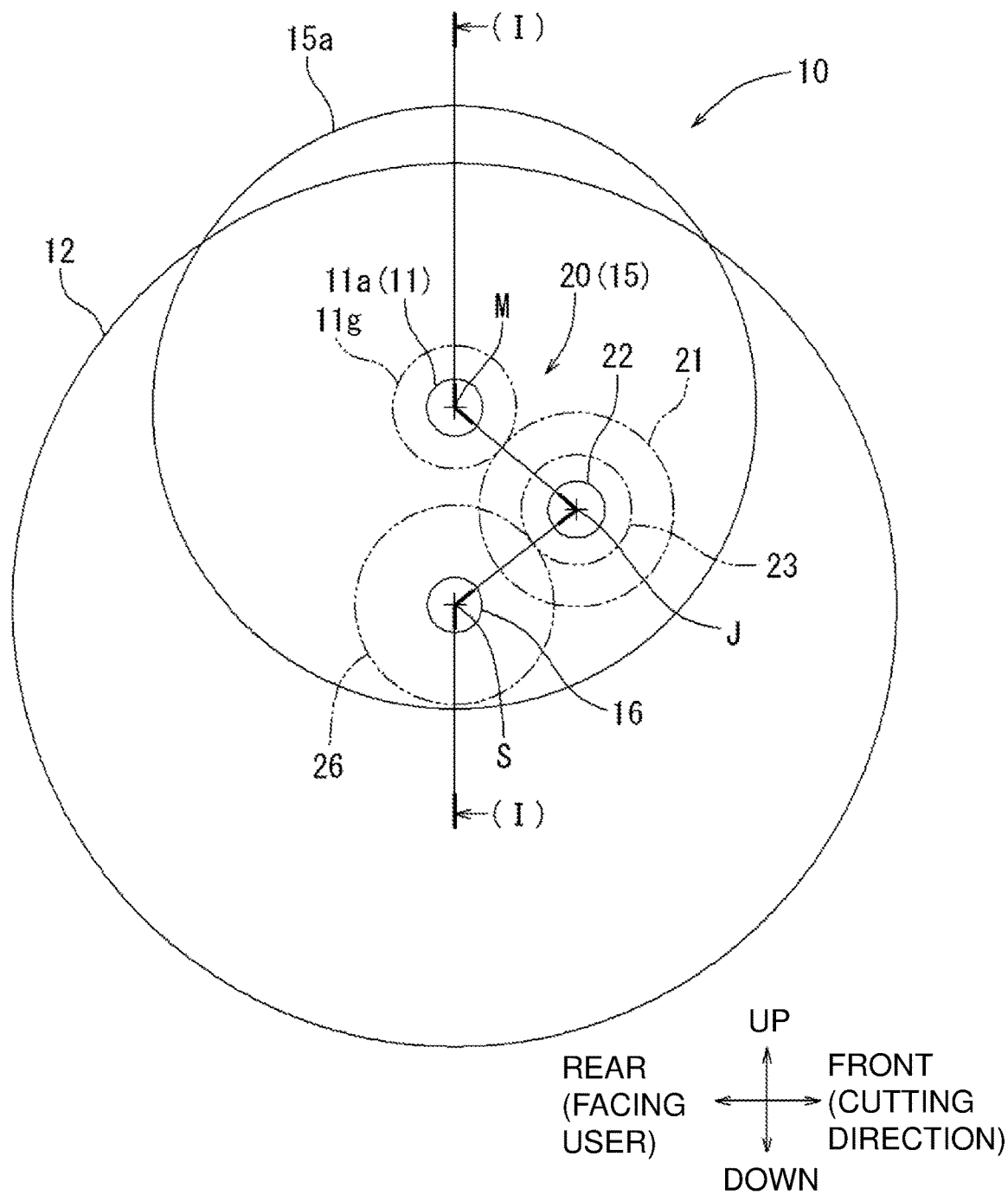
FIG. 2 is a schematic diagram of the gear train, as viewed in the direction indicated by arrow (II) in FIG. 1 (from a position adjacent to a rotary blade).

FIG. 2 is a schematic diagram of the gear train 20. FIG. 2 shows the gear train 20 as viewed from a position adjacent to the rotary blade 12. In FIG. 2, the right is defined as the front from the cutting machine body 10, and the left is defined as the rear. The cutting machine body 10 is moved forward to cause the rotary blade 12 to cut into the workpiece W for cutting. The cutting machine body 10 is moved by a user facing the rear of the cutting machine body 10. The right-left direction with respect to the components and structure is defined as viewed from the user.

Although not shown, the electric motor 11 includes a cylindrical motor housing 11d screwed to the gear housing 15a. The motor housing 11d supports a stator 11e along its inner surface. The stator 11e includes a rotor 11f inside the stator 11e. As shown in FIG. 1, a motor shaft 11a extends in the right-left direction through the center of the rotor 11f. The motor shaft 11a is supported with right and left bearings 11b and 11c in a manner rotatable about a motor shaft axis M. The right bearing 11b (adjacent to the rotary blade) is supported on the gear housing 15a. The left bearing 11c (opposite to the rotary blade) is supported on the left end (opposite to the rotary blade) of the motor housing 11d.

The motor shaft 11a has a distal end located in the gear housing 15a. The motor shaft 11a receives a first gear 11g at the distal end. The first gear 11g meshes with a second gear 21. The second gear 21 is fastened to a left portion of a countershaft 22. The countershaft 22 is located on the power transmission path between the motor shaft 11a and a final shaft 16 as a final output shaft. The countershaft 22 is integral with a third gear 23 on its right portion. The second gear 21 and the third gear 23, which are integral with the countershaft 22, each correspond to an intermediate gear and integrally rotate together. The countershaft 22 is supported on the gear housing 15a with right and left bearings 24 and 25 in a manner rotatable about a countershaft axis J.

The third gear 23 meshes with a fourth gear 26 as a final gear. The fourth gear 26 is supported on the final shaft 16. The final shaft 16 is the final output shaft in the reduction gear unit 15. The rotational output from the electric motor 11 is reduced in two stages, through the first gear 11g and the second gear 21 meshing with each other and through the third gear 23 and the fourth gear 26 meshing with each other, and is then transmitted to the final shaft 16.

The final shaft 16 is supported on the gear housing 15a with two bearings 27 and 28 adjacent to the rotary blade and one bearing 29 opposite to the rotary blade in a manner rotatable about an output shaft axis S. The two bearings 27 and 28 are ball bearings. The bearing 29 is a needle bearing.

The final shaft 16 has a distal end protruding into the stationary cover 14 and receiving the rotary blade 12 in the stationary cover 14. The rotary blade 12 held between an outer flange 12a and an inner flange 12b is locked with a fastener screw 12c, which is tightened into the distal end face of the final shaft 16.

The rotary blade 12 has a lower portion protruding below the lower surface of the base 2 through a window 2a and covered with a movable cover 17. The movable cover 17 can open and close along the periphery of the rotary blade 12.

The looped handle 13 is located above the reduction gear unit 15. The handle 13 includes a trigger switch lever 18 on its inner periphery. The switch lever 18 is pulled upward with a finger to activate the electric motor 11.

Figure 3:
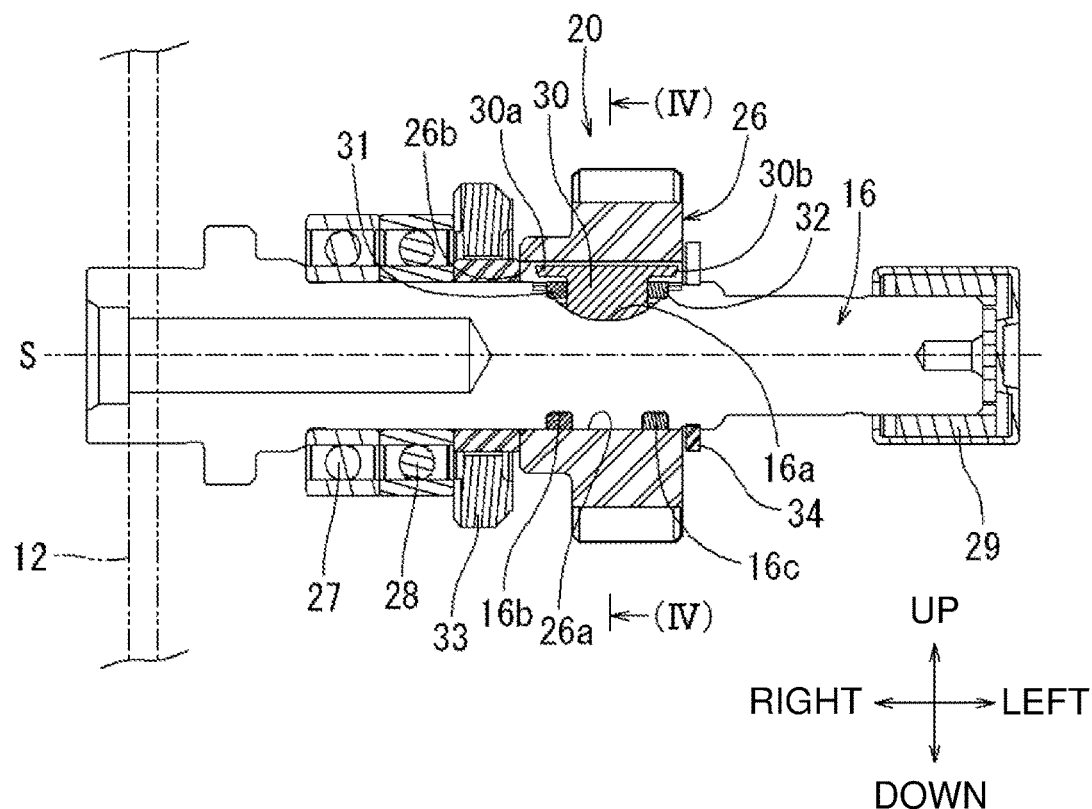
FIG. 3 is a longitudinal sectional view of a gear shock-absorbing structure including an output shaft and neighboring parts in a first embodiment.
Figure 4:
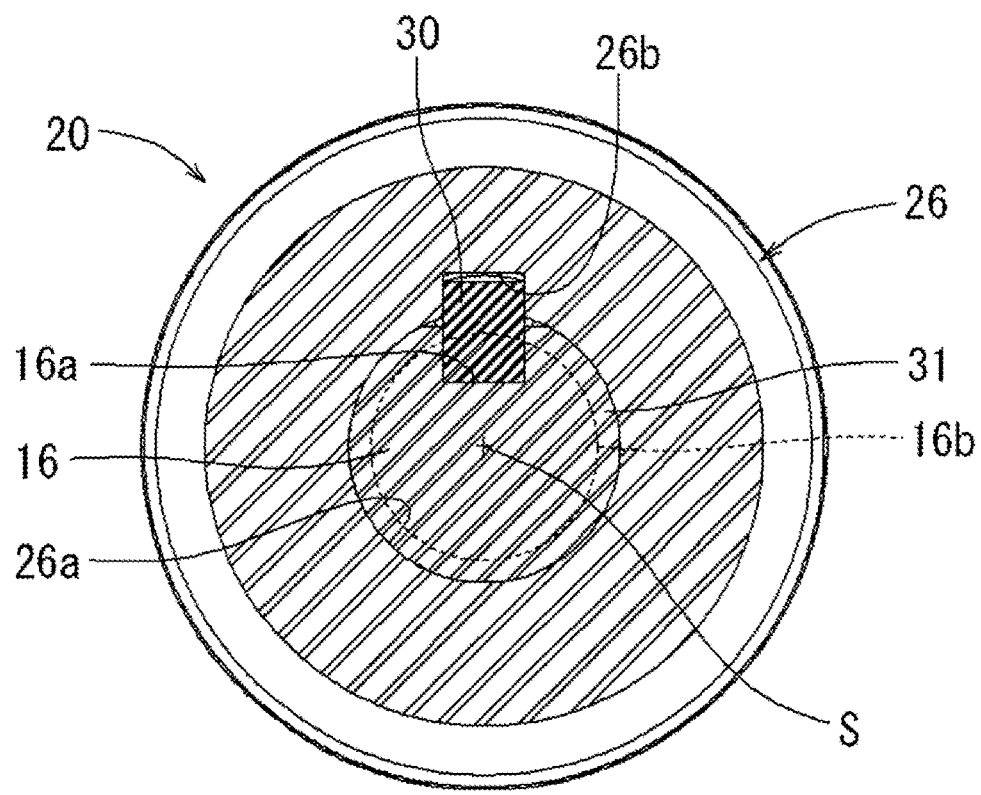
FIG. 4 is a cross-sectional view of the gear shock-absorbing structure in the first embodiment taken along line (IV)-(IV) in FIG. 3, as viewed in the direction indicated by arrows.
Figure 5:
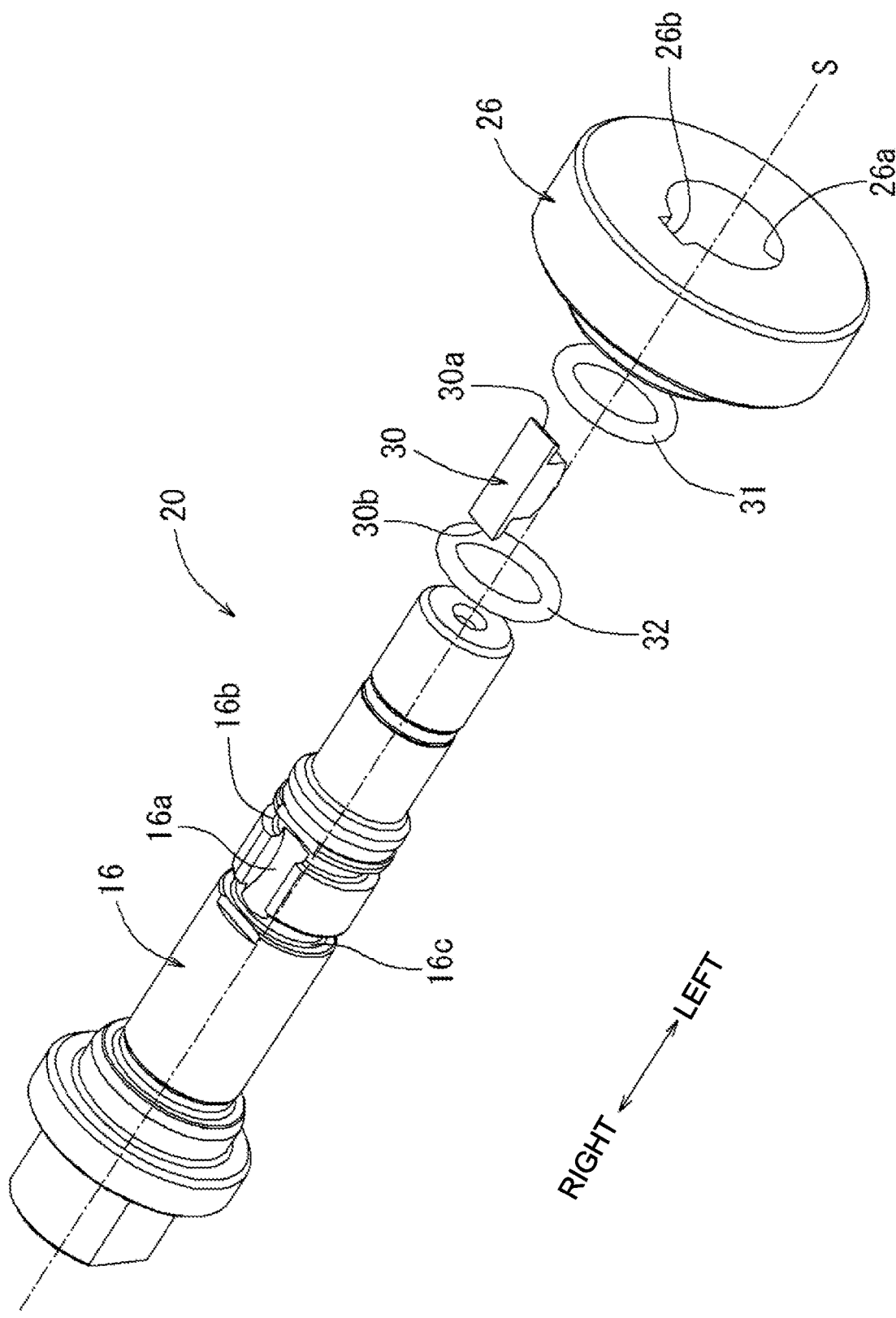
FIG. 5 is an exploded perspective view of the gear shock-absorbing structure in the first embodiment.

The portable cutting machine 1 in the present embodiment has a support structure for the final shaft 16 receiving the fourth gear 26 that meshes with the third gear 23, and more specifically has a shock-absorbing support structure that lowers the moment of inertia mainly applied to the fourth gear 26. The third gear 23 and the fourth gear 26 in the present embodiment are helical gears. The helical gears meshing together allow large rotational power (torque) to be efficiently transmitted with less backlash. The shock-absorbing structure for the fourth gear 26 will now be described. FIGS. 3 to 5 show the shock-absorbing structure for the fourth gear 26 in the first embodiment.

As shown in FIGS. 3 and 5, the fourth gear 26 is coupled to the final shaft 16 with a key, rather than by press-fitting. The fourth gear 26 is fitted with a minimum clearance using, for example, H fitting (H is an identifier of fitting specified by the Japanese Industrial Standard, or JIS). This stabilizes the behavior of the gear with no interference (or without press-fitting). Thus, the final shaft 16 has a key groove (final-shaft key groove) 16a on the outer periphery for receiving a key 30. The key groove 16a extends along the output shaft axis S. The final shaft 16 has annular grooves 16b and 16c on the right and left of the key groove 16a. As shown in FIGS. 4 and 5, the right and left grooves 16b and 16c each extend over the entire outer periphery. The grooves 16b and 16c respectively receive annular elastic members 31 and 32 being compressed in the radial direction. The elastic members 31 and 32 are thus elastically pressed against the bottoms and the right and left side walls of the grooves 16b and 16c and against the inner periphery of the fourth gear 26. The elastic members 31 and 32 in the present embodiment are rubber O-rings, allowing easy assembly. The two elastic members 31 and 32 being arranged in the axial direction more effectively accommodate any displacement of the fourth gear 26 relative to the final shaft 16, and also stabilize the posture of the fourth gear.

The fourth gear 26 has an inner periphery 26a also having a key groove (final-gear key groove) 26b for receiving the key 30. The fourth gear 26 is supported on the final shaft 16 with a fit tolerance of substantially H7, which is an identifier of fitting specified by the JIS. This creates a narrow clearance between the inner periphery 26a of the fourth gear 26 and the outer periphery of the final shaft 16. Unlike with press-fitting, the fourth gear 26 is supported in a manner slightly displaceable in the rotation direction about the output shaft axis S as well as in the radial direction.

The key 30 includes protrusions 30a and 30b on the right and left protruding in the axial direction along the output shaft axis S. As shown in FIG. 3, the protrusions 30a and 30b are located outward (upward) respectively from the elastic members 31 and 32. The protrusions 30a and 30b restrict the elastic members 31 and 32 from entering the key groove 26b on the fourth gear 26. The elastic members 31 and 32 are thus prevented from being damaged.

The fourth gear 26 is restricted from being displaced toward the rotary blade by a locknut 33 that fastens the two bearings 27 and 28. The fourth gear 26 is restricted from being displaced away from the rotary blade by a retainer ring 34.

In the shock-absorbing structure for the fourth gear 26 in the present embodiment, the fourth gear 26 as the final gear is displaceable relative to the final shaft 16 by a degree as small as substantially a fit tolerance in the rotation direction or the radial direction. Thus, under no load, the fourth gear 26 receives a lower moment of inertia than in known structures. This structure causes less impact (gear vibration) from the meshing teeth between the fourth gear 26 and the third gear 23, and thus less gear noise such as rattle.

The elastic members 31 and 32 accommodate any displacement of the fourth gear 26 relative to the final shaft 16. This structure causes less impact (gear vibration) from the meshing teeth and less gear noise.

The fourth gear 26 as the final gear is a helical gear. Thus, the elastic members 31 and 32 accommodate any displacement of the fourth gear 26 in the rotation direction, the radial direction, and the axial direction along the output shaft axis S, with less backlash between the fourth gear 26 and the third gear 23. Thus, the fourth gear 26 receives a lower moment of inertia in each direction under no load. This structure causes still less impact from the meshing teeth between the fourth gear 26 and the third gear 23, and thus still less gear noise.

The fourth gear 26 as the final gear being an angled gear, such as a helical gear or a spiral bevel gear, receives an axial force and thus easily causes axial vibration. The fourth gear 26 may be relatively displaceable in the axial direction, in addition to the rotation direction and the radial direction. The fourth gear 26 thus receives a lower moment of inertia in each direction under no load. This structure causes still less impact from the meshing teeth between the fourth gear 26 and the intermediate gear, and thus still less gear noise.

The two elastic members 31 and 32 are compressed in the radial direction between the final shaft 16 and the fourth gear 26. This structure can more effectively accommodate any displacement of the fourth gear 26 relative to the final shaft 16 in the rotation direction, the radial direction, or the axial direction along the output shaft axis S, thus receiving less impact from the meshing teeth between the fourth gear 26 and the third gear 23. The structure can also cause less gear noise under no load with sliding friction between the final shaft 16 and the elastic members 31 and 32 and between the fourth gear 26 and the elastic members 31 and 32, as well as with the elastic force from the elastic members 31 and 32.

The key 30 includes the protrusions 30a and 30b protruding in the axial direction along the output shaft axis S and laterally farther than the elastic members 31 and 32. Thus, the elastic members 31 and 32 are located near the key 30 and more effectively accommodate any displacement of the fourth gear 26 relative to the final shaft 16, without entering the key groove 26b. The elastic members 31 and 32 cannot absorb shock and may also be damaged when deforming and entering the key groove 26b on the fourth gear 26 facing the key groove 16a on the final shaft 16. In the present embodiment, the elastic members 31 and 32 maintain shock-absorbing capabilities and are prevented from being damaged. The protrusions 30a and 30b allow the elastic members 31 and 32 to remain in the grooves 16b and 16c without coming off and thus to maintain shock-absorbing capabilities without being damaged.

The shock-absorbing support structure for the fourth gear 26 described above may be modified in various manners. For example, the third gear 23 and the fourth gear 26 described as helical gears may also be spur gears. The protrusions 30a and 30b on the key 30 may be eliminated.

Second Embodiment

Figure 6:
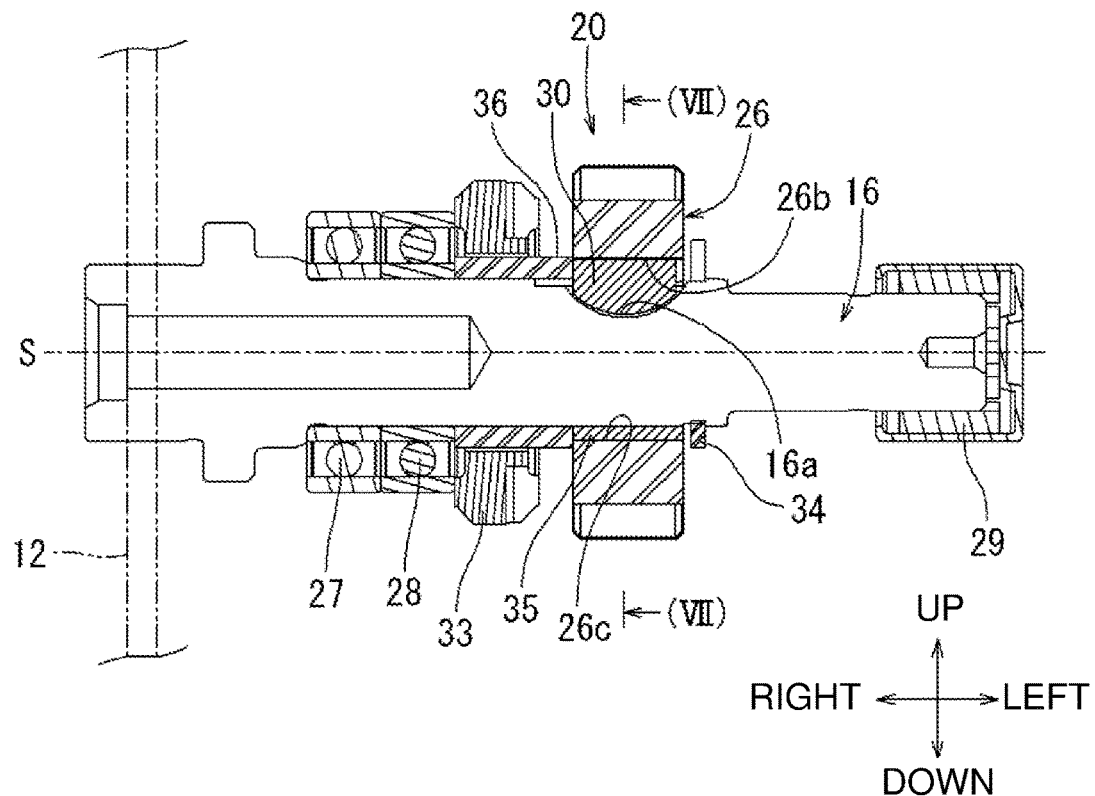
FIG. 6 is a longitudinal sectional view of a gear shock-absorbing structure including an output shaft and neighboring parts in a second embodiment.
Figure 7:
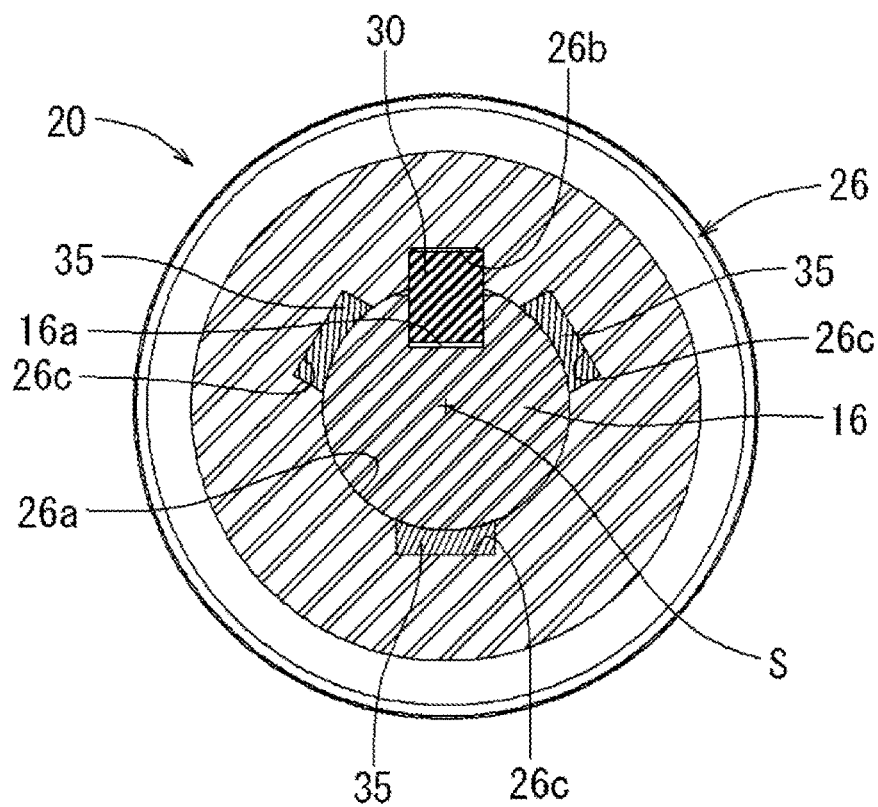
FIG. 7 is a cross-sectional view of the gear shock-absorbing structure in the second embodiment taken along line (VII)-(VII) in FIG. 6, as viewed in the direction indicated by arrows.
Figure 8:
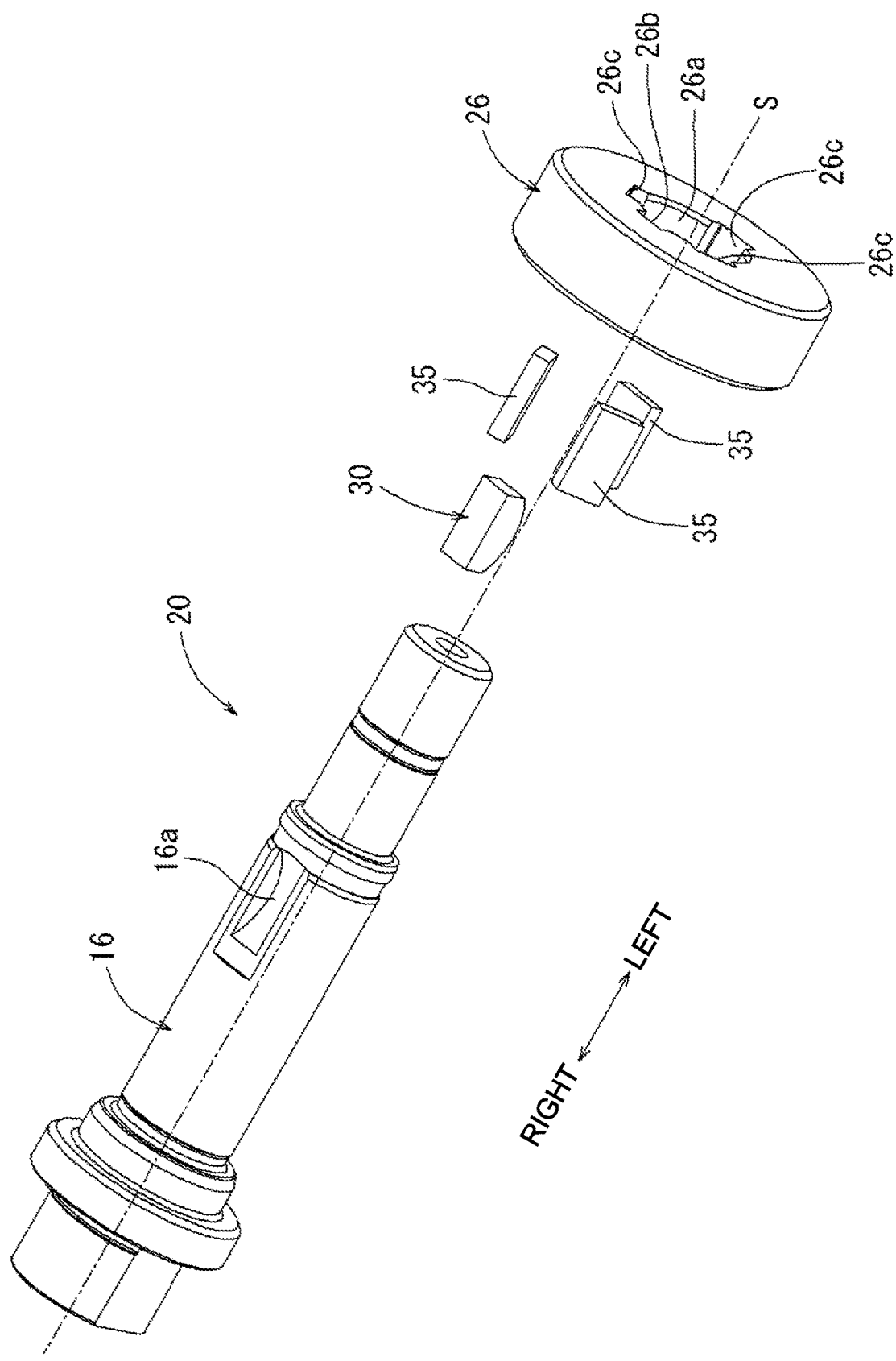
FIG. 8 is an exploded perspective view of the gear shock-absorbing structure in the second embodiment.

FIGS. 6 to 8 show a shock-absorbing support structure in a second embodiment. The components and the structures that are the same as those in the first embodiment will be given the same reference numerals, and will not be described. In the shock-absorbing support structure in the present embodiment, the fourth gear 26 is also coupled to the final shaft 16 with a key, rather than by press-fitting. Thus, the fourth gear 26 is supported on the final shaft 16 with a clearance as small as substantially a fit tolerance of H7 in the rotation direction and the radial direction. A key 30 in the present embodiment includes no protrusions 30a and 30b unlike in the first embodiment.

In the first embodiment, the two elastic members 31 and 32 are located on the right and left of the key 30 along the output shaft axis S. In the present embodiment, three elastic members 35 are located about the output shaft axis S.

As shown in FIGS. 7 and 8, a fourth gear 26 has an inner periphery 26a with one key groove 26b and three rectangular grooves 26c. The three grooves 26c are equally spaced about the output shaft axis S. The key groove 26b is between two adjacent grooves 26c. The three grooves 26c, as well as the key groove 26b, linearly extend across the inner periphery 26a from the left end to the right end. The three grooves 26c elastically receive the prismatic elastic members 35.

The three elastic members 35 received along the inner periphery 26a of the fourth gear 26 are elastically pressed against the outer periphery of the final shaft 16.

As shown in FIG. 6, the fourth gear 26 in the present embodiment is restricted from being displaced in the axial direction along the output shaft axis S with a sleeve 36 on the inner periphery of a locknut 33 and a retainer ring 34.

In the shock-absorbing support structure in the present embodiment, the fourth gear 26 is also supported in a manner slightly displaceable relative to the final shaft 16 with a clearance as small as substantially a fit tolerance in the rotation direction, the radial direction, and the axial direction. Under no load, the fourth gear 26 receives a lower moment of inertia and less impact with the third gear 23, thus causing less gear noise.

In the present embodiment, the elastic members 35 having a simpler columnar (e.g., prismatic) shape are placed between the final shaft 16 and the fourth gear 26, rather than the annular elastic members 31 and 32 such as O-rings used in the first embodiment. This structure allows the fourth gear 26 to be displaceable relative to the final shaft 16 to receive a lower moment of inertia, causing less impact from the meshing teeth between the fourth gear 26 and the intermediate gear. The elastic members 35 also accommodate any displacement of the fourth gear 26 relative to the final shaft 16, thus receiving less impact from the meshing teeth.

The linear grooves 26c may be formed, for example, simultaneously with the key groove 26b on the inner periphery 26a. This can also lower the machining cost as compared with when grooves are formed on the final shaft 16.

In the present embodiment, the three prismatic elastic members 35 are placed. In some embodiments, two or four or more cylindrical elastic members may be placed around the output shaft axis S between the inner periphery 26a of the fourth gear 26 and the final shaft 16.

Third Embodiment

Figure 9:
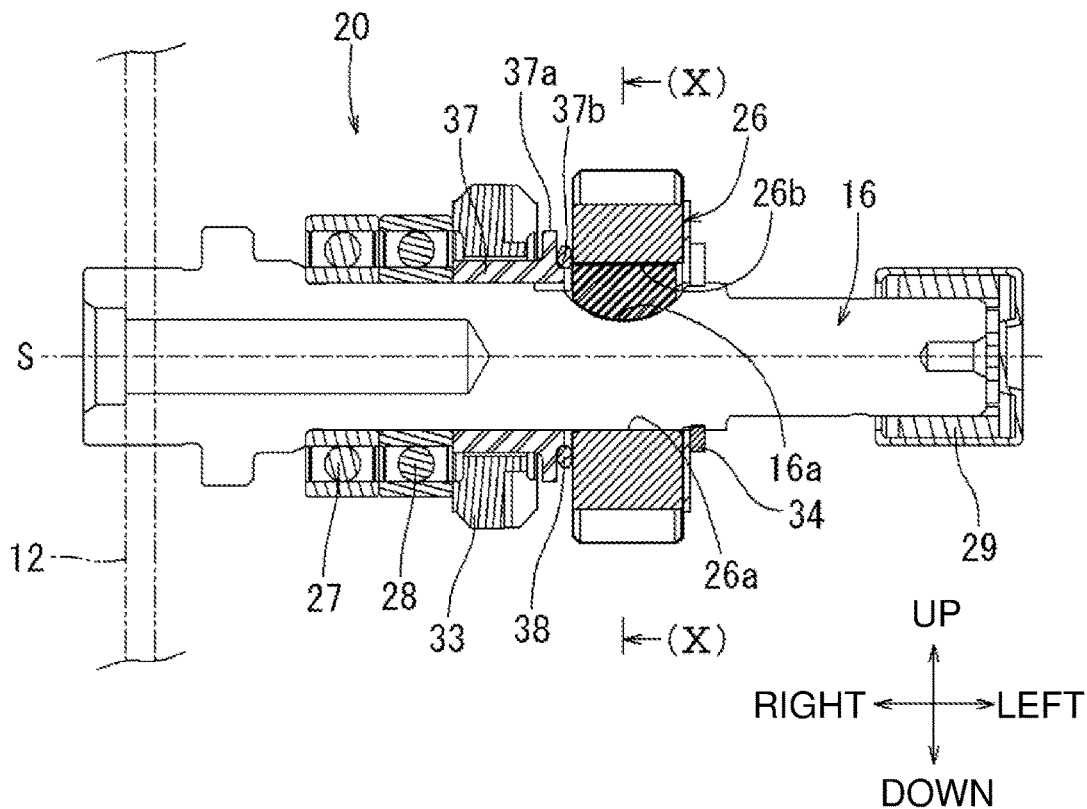
FIG. 9 is a longitudinal sectional view of a gear shock-absorbing structure including an output shaft and neighboring parts in a third embodiment.
Figure 10:
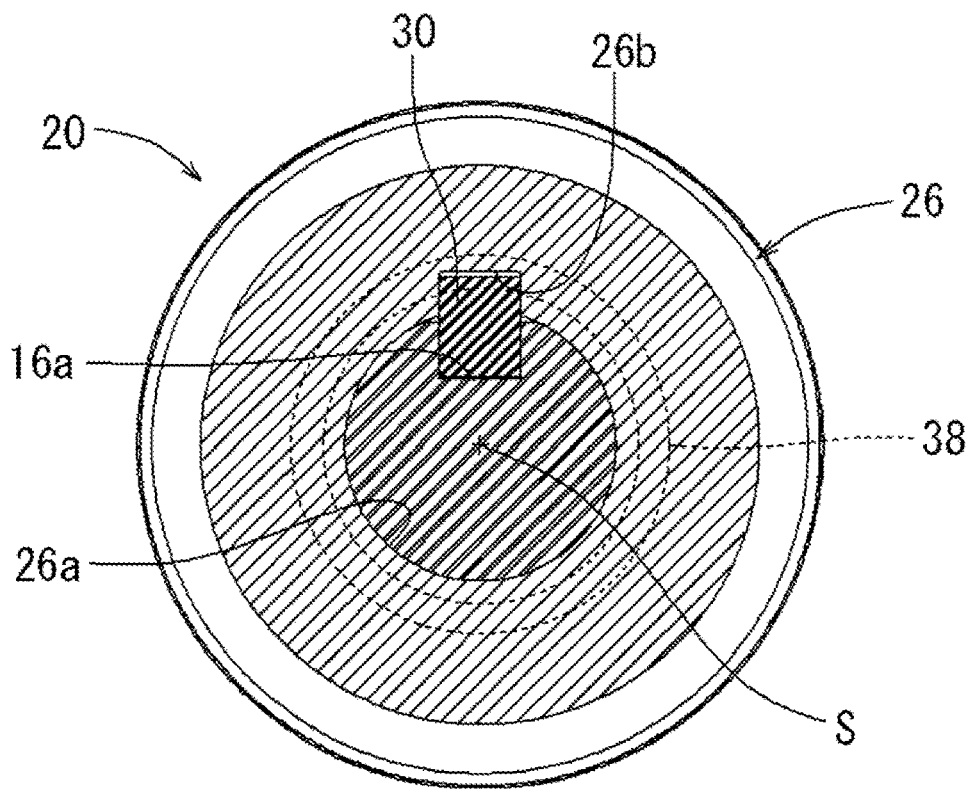
FIG. 10 is a cross-sectional view of the gear shock-absorbing structure in the third embodiment taken along line (X)-(X) in FIG. 9, as viewed in the direction indicated by arrows.
Figure 11:
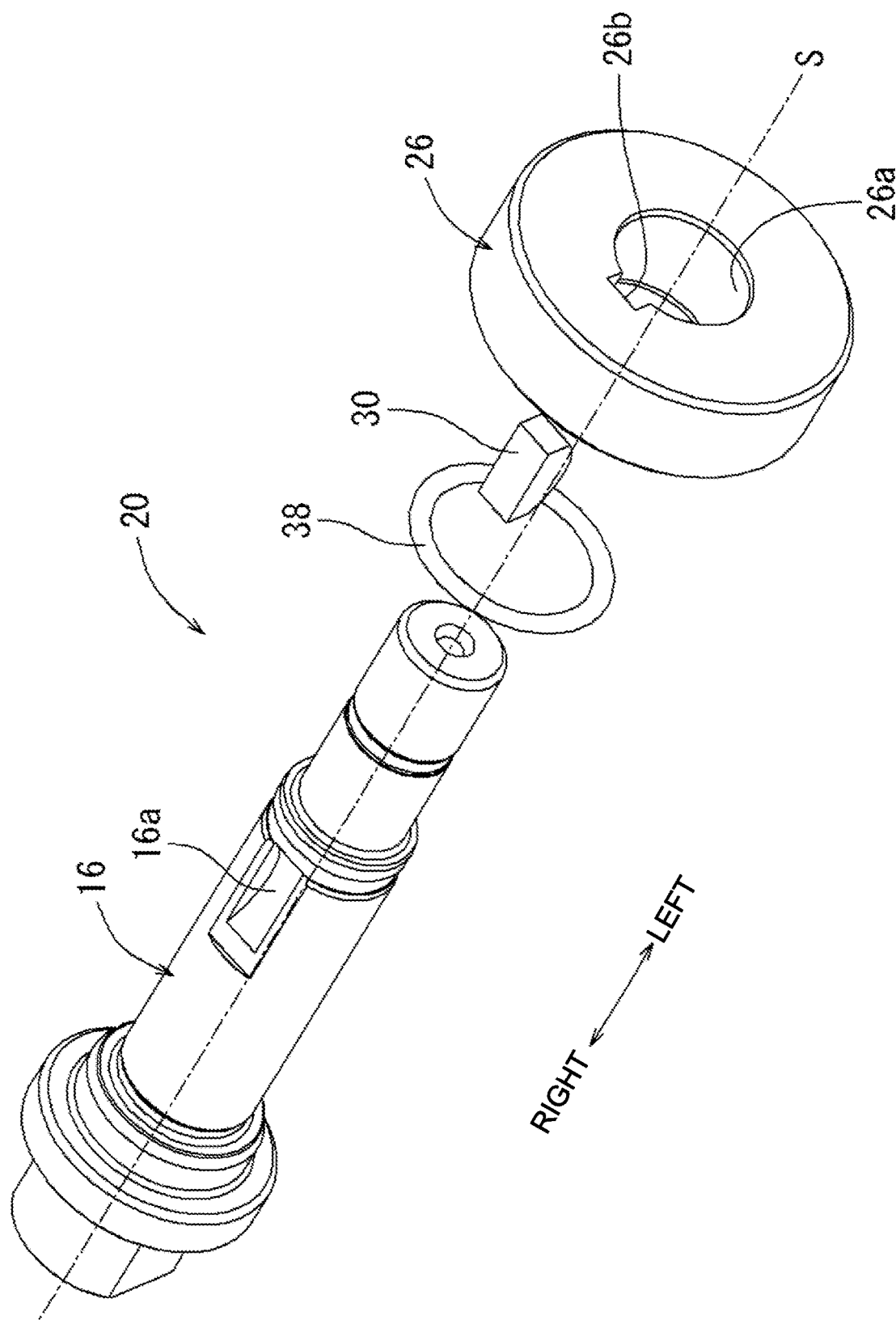
FIG. 11 is an exploded perspective view of the gear shock-absorbing structure in the third embodiment.

FIGS. 9 to 11 show a shock-absorbing support structure in a third embodiment. The components and the structures that are the same as those in the second embodiment will be given the same reference numerals, and will not be described.

In the shock-absorbing support structure in the present embodiment, the fourth gear 26 is also coupled to the final shaft 16 with a key, rather than by press-fitting. Thus, the fourth gear 26 is supported on the final shaft 16 with a clearance as small as substantially a fit tolerance of H7 in the rotation direction and the radial direction. As in the second embodiment, a key 30 in the present embodiment includes no protrusions 30a and 30b unlike the first embodiment.

As shown in FIG. 9, the structure in the present embodiment includes an annular elastic member 38 elastically pressed against the end face of the fourth gear 26 adjacent to the rotary blade. A sleeve 37 is placed on the inner periphery of a locknut 33 that fixes two bearings 27 and 28 adjacent to the rotary blade in the axial direction along the output shaft axis S. For example, the sleeve 37 is press-fitted on the outer periphery of the final shaft 16 and is fixed in the rotation direction, the radial direction, and the axial direction along the output shaft axis S.

The sleeve 37 includes a flange 37a protruding in the radial direction at the end of the sleeve 37 opposite to the rotary blade. One elastic member 38 is held elastically in the axial direction along the output shaft axis S between the flange 37a and the end face of the fourth gear 26 adjacent to the rotary blade. As in the first and second embodiments, the fourth gear 26 is restricted by a retainer ring 34 from being displaced away from the rotary blade. Thus, with the fourth gear 26 having a large helix angle, the elastic member 38, which is compressed in the axial direction between the fourth gear 26 and the final shaft 16, efficiently accommodates any displacement of the fourth gear 26 relative to the final shaft 16 in the rotation direction, the radial direction, and particularly the axial direction.

The elastic member 38 in the present embodiment is also a rubber O-ring. The flange 37a has a step 37b on the end face opposite to the rotary blade for restricting the displacement of the elastic member 38 in the radial direction.

In the shock-absorbing support structure in the present embodiment, the fourth gear 26 is also supported in a manner slightly displaceable relative to the final shaft 16 with a clearance as small as substantially a fit tolerance in the rotation direction, the radial direction, and the axial direction. Under no load, the fourth gear 26 receives a lower moment of inertia and less impact with the third gear 23, thus causing less gear noise.

The elastic member 38 in the present embodiment also accommodates any displacement of the fourth gear 26 relative to the final shaft 16 in the rotation direction, the radial direction, and the axial direction along the output shaft axis S. This structure causes less impact from the meshing teeth between the fourth gear 26 and the third gear 23, thus causing less gear noise.

In the present embodiment, one O-ring is placed as the elastic member 38. In some embodiments, multiple O-rings, one disc-shaped elastic sheet, or one cylindrical elastic sleeve may be placed. In some embodiments, multiple elastic protrusions may be placed along the circumferential direction of the flange 37a.

The shock-absorbing support structures in the first to third embodiments may be combined. In the first embodiment, the elastic members 31 and 32 are on the final shaft 16. In some embodiments, the elastic members 31 and 32 may be on the inner periphery 26a of the final gear 26 or on both the inner periphery 26a and the final shaft 16. One elastic member, or two or more elastic members may be either on the final shaft 16 or on the inner periphery 26a of the final gear 26.

In the second embodiment, the elastic members 35 are on the inner periphery 26a of the final gear 26. In some embodiments, the elastic members 35 may be on the final shaft 16 or on both the final shaft 16 and the inner periphery 26a. In any of these cases, three elastic members 35 may be equally spaced about the axis, or one, two, or four or more elastic members 35 may be located about the axis.

In the first to third embodiments, the gear train 20 has the motor shaft axis M, the countershaft axis J, and the output shaft axis S parallel to one another. In some embodiments, the gear train may have the shaft axes crossing one another with a bevel gear. The illustrated shock-absorbing support structure may be applied to such a gear train with the similar effects.

The shock-absorbing support structure in each embodiment is not limited to the double-stage reduction mechanism having the countershaft 22. A reduction gear train having three or more stages or a reduction gear unit including a gear train and a belt transmission assembly may also have this structure.

A gear train including an idler gear that meshes with a driver gear and a follower gear (on a final shaft) may also have the shock-absorbing support structure in each embodiment to simply maintain a certain distance between their axes without speed reduction.

The use of the shock-absorbing support structure in each embodiment is not limited to portable circular saws for cutting wood workpieces. Other portable cutting machines including cutters having a diamond wheel as a blade and disc grinders having a grinding wheel as a rotary blade may also use this shock-absorbing support structure. The structure is widely usable for other reduction gear units in power tools that output rotational power, including drilling tools, screw tightening tools, disc grinders, and polishers.

REFERENCE SIGNS LIST

W workpiece
1 portable cutting machine
2 base
2a window
10 cutting machine body
11 electric motor
11a motor shaft
11b, 11c bearing
11d motor housing
11e stator
11f rotor
11g first gear
12 rotary blade
12a outer flange
12b inner flange
12c fastener screw
13 handle
14 stationary cover
15 reduction gear unit 15a gear housing
16 final shaft (output shaft)
16a key groove
16b, 16c groove
17 movable cover
18 switch lever
20 gear train
21 second gear
22 countershaft
23 third gear
24, 25 bearing
26 fourth gear (final gear)
26a inner periphery
26b key groove
26c groove
27, 28, 29 bearing
30 key
30a, 30b protrusion
31, 32 elastic member (first embodiment)
33 locknut
34 retainer ring
35 elastic member (second embodiment)
37 sleeve
37a flange
37b step
38 elastic member (third embodiment)

The invention claimed is:

1. A power tool comprising:
   a blade;
   an electric motor including a motor shaft; and
   a gear train configured to transmit a rotational output of the electric motor to the blade, the gear train including
      a first gear supported on the motor shaft,
      a countershaft,
      an intermediate gear that (i) meshes with the first gear and (ii) is supported on the countershaft,
      a final shaft having a distal end attached to the blade,
      a final gear that (i) meshes with the intermediate gear and (ii) is supported on the final shaft, and
      at least one elastic member (i) between the final shaft and the final gear and (ii) that continuously and annularly surrounds the final shaft.

2. The power tool according to claim 1, wherein the at least one elastic member is elastically pressed between the final shaft and the final gear.

3. The power tool according to claim 1, wherein the final gear includes an angled gear.

4. The power tool according to claim 1, wherein the final gear includes a helical gear or a spiral bevel gear.

5. The power tool according to claim 1, wherein the at least one elastic member is compressed in a radial direction between the final shaft and the final gear.

6. The power tool according to claim 1, wherein the final shaft has at least one annular groove extending in a circumferential direction, and
the at least one elastic member is in the at least one annular groove.

7. The power tool according to claim 1, wherein the final gear has at least one annular groove extending in a circumferential direction, and
the at least one elastic member is in the at least one annular groove.

8. The power tool according to claim 1, wherein the at least one elastic member includes two elastic members spaced in an axial direction.

9. The power tool according to claim 6, further comprising:
   a key coupling the final gear to the final shaft, wherein
   the final shaft has a final-shaft key groove intersecting the at least one annular groove,
   the final gear has a final-gear key groove intersecting the at least one annular groove, and
   the key includes a protrusion configured to restrict the at least one elastic member from entering the final-gear key groove.

10. The power tool according to claim 1, wherein the final shaft includes a protrusion protruding in a radial direction, and
the at least one elastic member is compressed in an axial direction between the protrusion and the final gear.

11. The power tool according to claim 2, wherein the final gear includes an angled gear.

12. The power tool according to claim 2, wherein the final gear includes a helical gear or a spiral bevel gear.

13. The power tool according to claim 3, wherein the final gear includes a helical gear or a spiral bevel gear.

14. The power tool according to claim 2, wherein the at least one elastic member is compressed in a radial direction between the final shaft and the final gear.

15. The power tool according to claim 3, wherein the at least one elastic member is compressed in a radial direction between the final shaft and the final gear.

16. The power tool according to claim 7, further comprising:
   a key coupling the final gear to the final shaft, wherein
   the final shaft has a final-shaft key groove intersecting the at least one annular groove,
   the final gear has a final-gear key groove intersecting the at least one annular groove, and
   the key includes a protrusion configured to restrict the at least one elastic member from entering the final-gear key groove.

17. The power tool according to claim 1, wherein there is a clearance between the final shaft and the final gear.

18. The power tool according to claim 17, wherein the final gear is supported on the final shaft with a fit tolerance of H7, which is an identifier of fitting specified by the JIS.

19. The power tool according to claim 1, wherein the at least one elastic member is between a cylindrical surface of the final shaft and the final gear and directly contacts the final shaft.

* * * * *